(12) United States Patent
Hamlin

(10) Patent No.: US 9,119,500 B2
(45) Date of Patent: Sep. 1, 2015

(54) GRIDDLE PLATE FOR A GAS GRILL

(71) Applicant: Edward W. Hamlin, Altamonte Springs, FL (US)

(72) Inventor: Edward W. Hamlin, Altamonte Springs, FL (US)

(*) Notice: Subject to any disclaimer, the term of this patent is extended or adjusted under 35 U.S.C. 154(b) by 271 days.

(21) Appl. No.: 13/911,269

(22) Filed: Jun. 6, 2013

(65) Prior Publication Data

US 2014/0360383 A1  Dec. 11, 2014

(51) Int. Cl.
| | |
|---|---|
| *A47J 37/10* | (2006.01) |
| *A47J 37/07* | (2006.01) |
| *A47J 37/06* | (2006.01) |
| *A21B 3/15* | (2006.01) |

(52) U.S. Cl.
CPC ............ *A47J 37/0786* (2013.01); *A47J 37/067* (2013.01); *A47J 37/10* (2013.01); *A21B 3/15* (2013.01)

(58) Field of Classification Search
CPC ........... A47J 37/10; A47J 37/067; A21B 3/15
USPC ................ 99/422, 357, 340, 646 R, 401, 447
See application file for complete search history.

(56) References Cited

U.S. PATENT DOCUMENTS

| | | | | |
|---|---|---|---|---|
| 1,201,138 | A | * 10/1916 | Bingham | 126/376.1 |
| 1,204,429 | A | * 11/1916 | Griswold | 99/425 |
| 2,198,647 | A | * 4/1940 | Wolcott | 99/340 |
| 2,554,412 | A | * 5/1951 | Kavanagh | 99/425 |
| 3,747,509 | A | * 7/1973 | Hinkle | 99/422 |
| 3,850,087 | A | * 11/1974 | Landblom et al. | 99/422 |
| 5,277,106 | A | 1/1994 | Raymer et al. | |
| 5,431,091 | A | 7/1995 | Couture | |
| 6,782,801 | B1 | 8/2004 | Correa et al. | |
| 7,059,318 | B2 | 6/2006 | Cornfield | |
| D581,207 | S | 11/2008 | Leavens et al. | |
| D592,908 | S | 5/2009 | Hamlin | |
| D594,276 | S | 6/2009 | Hamlin | |
| D604,098 | S | 11/2009 | Hamlin | |

* cited by examiner

*Primary Examiner* — Reginald L Alexander
(74) *Attorney, Agent, or Firm* — Williams M. Hobby, III

(57) ABSTRACT

This invention is related to a griddle plate for a gas grill and especially to a griddle plate which controls the heat from the gas grill flames with a grate on the bottom side thereof which grate forms a cooking container support for baking goods on the gas grill when the griddle plate is turned bottom side up. The grate on the bottom side of the griddle plate also allows for heating only a portion of the griddle plate cooking surface by controlling the burners in the gas grill.

5 Claims, 2 Drawing Sheets

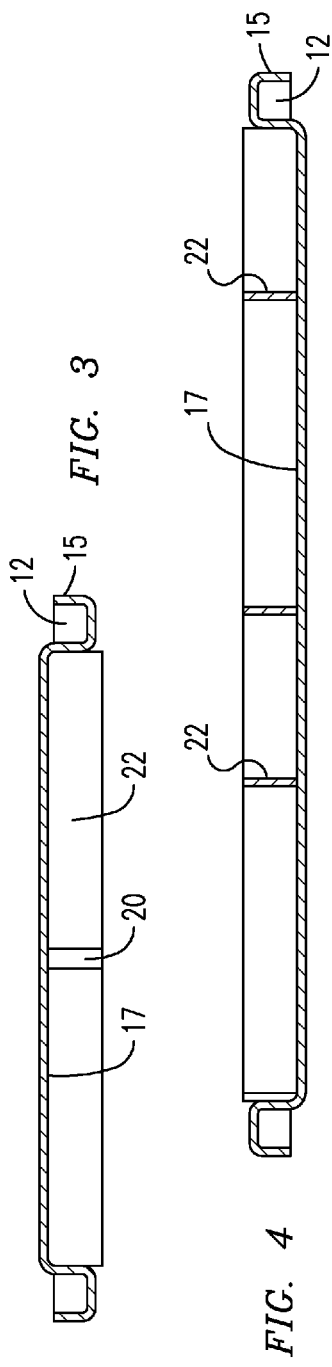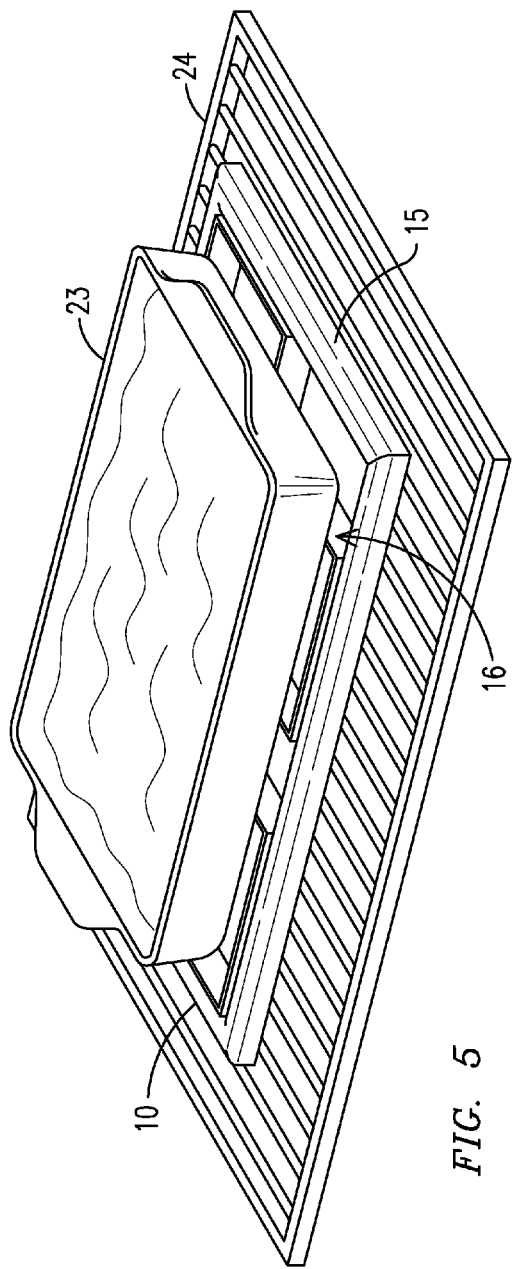

GRIDDLE PLATE FOR A GAS GRILL

FIELD OF THE INVENTION

This invention is related to a griddle plate for a gas grill and especially to a griddle plate which controls the heat from the gas grill flames with a grate on the bottom side thereof which grate forms a cooking container support for baking goods on the gas grill when the griddle plate is turned bottom side up.

BACKGROUND OF THE INVENTION

A barbeque grill is a device for cooking food by applying heat directly below a grill. There are several varieties of grills but most fall into one of two categories, either gas fueled or charcoal. Barbequing is a pervasive tradition in much of the world. Gas fueled grills typically use propane (LP) or natural gas (NG) as a fuel source, with the gas flame either cooking the food directly or heating grilling elements which in turn radiate the heat necessary to cook the food. Grilling has become a popular method of cooking food due to the unique flavors and texture imparted to the food during the grilling process. Grilling can be performed outdoors or indoors using gas.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill has also become popular when cooking foods not as well suited for cooking directly on a grill in an open flame. One problem with using a griddle directly on a grill over an open flame is the control of the heating of the griddle cooking surface and when it is desirable to use only a portion of the surface of griddle cooking surface to cook a lesser amount of food on the griddle. In addition it is sometimes desirable to isolate the food being cooked in a container from the direct heat of the grill flame.

In U.S. Pat. No. 5,277,106 to Raymer et al. an easily assembled barbeque grill has a heat distribution plate for more evenly distributing heat from the grill open flame. The Couture U.S. Pat. No. 5,431,091 is a combined unit for cooking, heating and gratinating food. The Cornfield U.S. Pat. No. 7,059,318 is a multi-purpose stovetop grilling and cooking device. The Correa et al. U.S. Pat. No. 6,782,801 is a stovetop barbeque for placement over the flame of a gas stove and has a grate like grilling surface. The Leavens et al. U.S. Design Patent No. D581,207 is a barbeque grill plate which appears to have a grate-like surface on one side and a patterned surface on the other side thereof. In my prior U.S. Design Patent No. D604,098 a round grill plate with radially extending arms extending from the outer rim towards the center thereof is shown. My Design Patent No. D594,276 is for a Grill Plate while my Design Patent No. D592,908 is for a Griddle Grate.

The present invention relates to a griddle plate for sitting on a gas grill having an open flame therebeneath which allows adjustments to the temperature of areas of the cooking surface of the griddle plate by using less than all the burners of the grill. Turning the griddle plate over for placement of the flat cooking surface directly onto the grill allows the griddle plate to be used as a container supporting grate for baking or cooking goods that are not otherwise conductive to grilling or cooking on a griddle plate.

SUMMARY OF THE INVENTION

This invention is related to a griddle plate for sitting on a grill grate and especially to a griddle plate which allows for the control of heat from a gas grill into zones and which can be turned over on the grate and used to support a cooking utensil for cooking foods in the utensils.

A griddle plate for a gas grill has a grate formed on the bottom side thereof which grate sits on the burner grill for controlling the heating of the cooking surface of the griddle from the flames of the grill burners. The griddle plate can then be turned over to position the griddle plate cooking surface onto the grill over the flames to allow the grate to support a cooking container for backing foods in the container. The griddle plate top side has a generally flat cooking surface with a grease trap formed therein for cooking on the top side thereof when the griddle plate is placed on a grill. The griddle plate bottom side has a recessed area forming a periphery wall therearound which is the other side of the grease channels on the top side. A cooking container supporting grate is fixedly attached to the bottom of the recessed area which grate extends above the periphery walls of the recessed area. The grate is formed with ribs attached to the bottom of the griddle bottom side recessed area which ribs are positioned to form channels to direct heat from one or more of a plurality of burners to a predetermined area on the griddle plate when the griddle plate bottom side is placed on a grill. In this way only a portion of the burners on a gas grill need to be operated when grilling smaller amounts of food. The griddle plate bottom side grate ribs protruding above the perimeter walls form a grate surface to hold a cooking container thereon when the griddle top side is placed onto the cooking grill for baking or cooking food in the cooking container. In this way a griddle plate may be heated in zones when cooking on the cooking surface and then turned over to support a cooking container on the grate for baking or cooking in the cooking container.

BRIEF DESCRIPTION OF THE DRAWINGS

The accompanying drawings, which are included to provide further understanding of the invention are incorporated in and constitute a part of the specification, and illustrate an embodiment of the invention and together with the description serve to explain the principles of the invention.

In the drawings:

FIG. 3 is a sectional view taken on the line 3-3 of FIG. 1.

FIG. 4 is a sectional view taken on the line 4-4 of FIG. 2.

FIG. 5 is a perspective view of the griddle plate of FIGS. 1 and 2 sitting on a grill and having a cooking utensil mounted sitting on the bottom side of the griddle plate.

DETAILED DESCRIPTION OF EXEMPLARY EMBODIMENT

This invention relates to a griddle plate for sitting on a grill grate and especially to a griddle plate which controls the heat from a gas grill for more evenly heating the griddle plate surface or for heating only a portion or separate zone of the griddle plate and which can also be turned over on the gas grill and used to support a cooking container for cooking foods, such as by baking, in the container.

Figure 1:
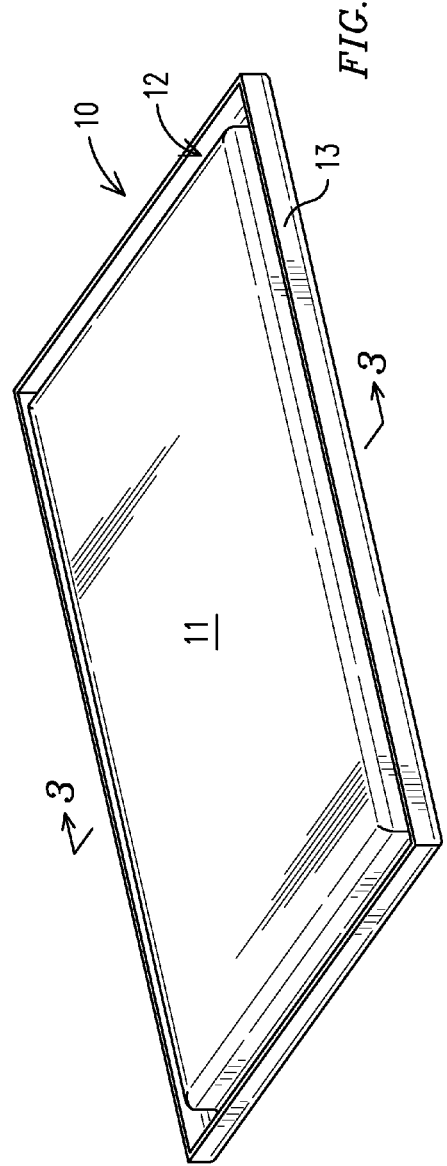
FIG. 1 is a top side perspective view of a zone griddle in accordance with the present invention.
Figure 2:
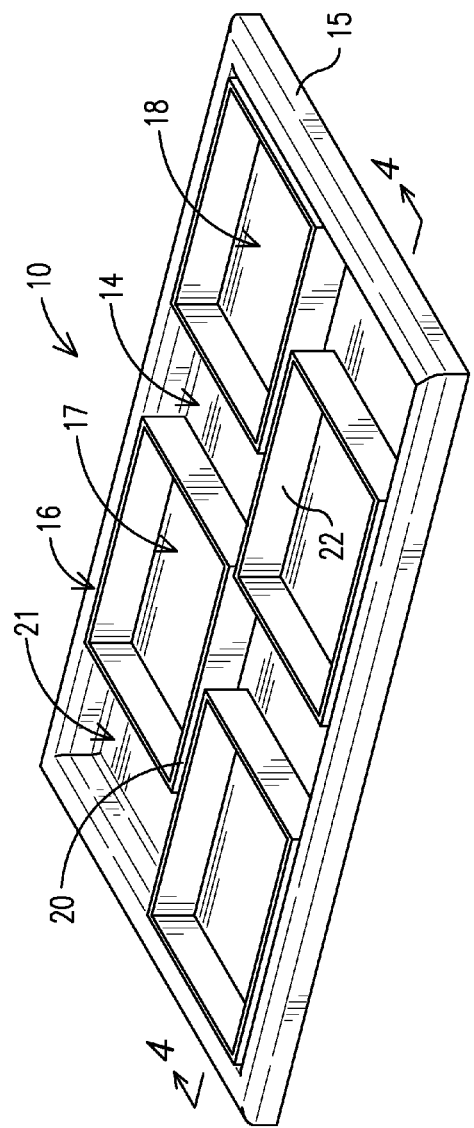
FIG. 2 is a bottom side perspective of the griddle of FIG. 1.

Referring to FIGS. 1 through 5, the top of the griddle plate 10 has a flat cooking surface 11 and a grease well 12 around the perimeter of the cooking surface 11 for catching grease and oils and the like from the cooking surface while cooking thereon. The grease well 12 has a surrounding lip 13. The bottom side of the griddle plate 10 has a sunken area 14 formed by a perimeter wall 15. The perimeter wall 15 is formed by the bottom side of the grease well 12 on the top side of the griddle plate 10. The sunken area has a plurality of ribs 22 fixedly attached to the bottom 17 of the recessed area to form a grate 16. The grate 16 is of a predetermined shape illustrated generally as four open squares 18. Each Square grate part 18 is carefully spaced from the other squares by channels 20 and with open areas 21 between the raised ribs 22. The grate 16 is made up of ribs 22 which extend above the perimeter wall 15 so that when the griddle plate 10 is turned over with the cooking surface 11 is put directly upon the grill 24 which may have a plurality of burners thereunder. The grate 16 can have a cooking container 23 placed thereon as seen in FIG. 5. This isolates the cooking container from the direct heat of the burner as well as directly from the heat from the griddle plate cooking surface 11. The layout of the grate 16 helps distribute the heat from multiple burners under the gas grill to even out the heat on the cooking surface 11 of the griddle plate. It also allows less than the total number of burners to be operated to raise the cooking surface 11 heat mostly onto a partial or zoned area while keeping other parts of the griddle cooking surface at a much lower warming temperature.

In operation, the griddle plate 10 can be placed on a gas grill, such as an outdoor barbeque grill, with the sunken area 14 side facing the flames from the gas grill 24 and the grate 14 facing down over the burners. The cooking surface 11 of the griddle plate 10 can then be used to cook items on the griddle, such as pancakes and the like. Some food, such as meat, is normally grilled directly on the grill 24 in the burner flames. The griddle plate 10 can then be turned over or rotated to place the griddle plate cooking surface 11 or top side directly onto the grill 24 as seen in FIG. 5. In this position the grate 16 ribs 22 protrude above the perimeter wall 15. The grate 16 then isolates the heat in such a matter that when a cooking container 23 is placed on top of the grate 16 it can be used for baking food in the container 23. The griddle plate 10 advantageously allows a barbeque grill or the like to grill food on the grill 24 or to cook food on a hot griddle plate cooking surface 11 and to bake food in a cooking container 23 all on the same gas grill while controlling the heating of the griddle plate 10.

When the griddle plate 10 is placed on a grill over the flames with the cooking surface 11 facing up as a griddle, some burners, but not all the grill burners, can be turned on to heat a portion of the griddle 10 cooking surface 11. The grate 16 is then facing the flames under the grill 24 and direct and isolate the heat from the flames to predetermined areas or zones or can provide a more uniform heat to the griddle plate when all burners are turned on. My tests have shown that only a portion of the griddle plate cooking surface reaches a cooking temperature when some burners are turned off while other areas of the griddle plate cooking surface maintain a lower temperature which can be used for maintaining foods warm. FIG. 5 illustrates lasagna being cooked on the griddle plate bottom side in the container 23 resting on the grate 16.

It should be clear at this time that a griddle plate which can provide zoned heat coverage to one side and can be rotated to provide a raised grate for supporting a cooking container for cooking baked goods, and the like. However the present invention is not to be considered limited to the forms shown which are to be considered illustrative rather than restrictive.

I claim:

1. A griddle plate for a gas grill comprising:
   a griddle plate having a top and a bottom side;
   said griddle plate top side having a generally flat cooking surface and a grease trap formed therein for grilling on the top side thereof when said griddle plate is placed on a gas grill;
   said griddle plate bottom side having a recessed area formed with a perimeter wall therearound and having a grate fixedly attached in the recessed area thereof and extending above said perimeter wall, said grate having a plurality of ribs attached to said griddle bottom side recessed area to form a plurality of enclosed shapes and positioned to form channels between said enclosed shapes to control the heat from at least one of a plurality of burners to a predetermined area on said griddle plate when said griddle bottom side is placed on a gas grill to thereby heat a predetermined area of said griddle plate top side, said griddle plate bottom side grate ribs protruding above said perimeter walls to form a grate surface to hold a cooking container when said griddle top side is placed onto the gas grill;
   whereby a griddle plate has a cooking surface for cooking on a gas grill on one side and a cooking container supporting and heat controlling grate on the other side thereof.

2. The griddle plate for a gas grill in accordance with claim 1 in which said griddle plate top side grease trap forms a perimeter channel in said top side.

3. The griddle plate for a gas grill in accordance with claim 2 in which said griddle plate top side grease trap perimeter channel forms the bottom side perimeter wall.

4. The griddle plate for a gas grill in accordance with claim 3 in which said plurality of grate ribs plurality of enclosed shapes form a plurality of squares.

5. The griddle plate for a gas grill in accordance with claim 4 in which said plurality of grate ribs form a plurality of square shapes separated one from the other to form channels therebetween.

* * * * *